US008875717B2

(12) United States Patent
Murzynski et al.

(10) Patent No.: US 8,875,717 B2
(45) Date of Patent: Nov. 4, 2014

(54) STATIC DISSIPATIVE PERSONAL CARE APPARATUS FOR GROOMING HAIR

(75) Inventors: Maciej Murzynski, Verona, WI (US); David W. Everett, Verona, WI (US)

(73) Assignee: Spectrum Brands, Inc., Middleton, WI (US)

( * ) Notice: Subject to any disclaimer, the term of this patent is extended or adjusted under 35 U.S.C. 154(b) by 317 days.

(21) Appl. No.: 12/754,065

(22) Filed: Apr. 5, 2010

(65) Prior Publication Data

US 2011/0240053 A1 Oct. 6, 2011

(51) Int. Cl.

| | |
|---|---|
| A45D 24/00 | (2006.01) |
| A45D 44/00 | (2006.01) |
| H01B 1/02 | (2006.01) |
| H01B 1/08 | (2006.01) |
| B32B 5/16 | (2006.01) |
| B32B 27/00 | (2006.01) |
| B32B 9/04 | (2006.01) |
| A45D 1/00 | (2006.01) |
| A45D 2/00 | (2006.01) |
| A45D 8/00 | (2006.01) |
| A45D 20/00 | (2006.01) |
| A45D 26/00 | (2006.01) |
| A45D 1/04 | (2006.01) |
| A46B 15/00 | (2006.01) |
| B32B 9/00 | (2006.01) |

(52) U.S. Cl.
CPC ............... *A45D 1/00* (2013.01); *A46B 15/002* (2013.01); *B32B 9/005* (2013.01); *A46B 15/0018* (2013.01); *B32B 9/007* (2013.01); *A45D 2/00* (2013.01); *A45D 8/00* (2013.01); *A45D 20/00* (2013.01); *A45D 24/00* (2013.01); *A45D 26/00* (2013.01); *A45D 1/04* (2013.01); *A45D 2/001* (2013.01)
USPC ........ 132/163; 132/333; 252/518.1; 428/323; 428/328; 428/421; 428/422; 428/447

(58) Field of Classification Search
CPC ..... A45D 24/00; A45D 1/00; A46B 15/0018; A46B 15/002; G11B 5/72; B32B 9/005; B32B 9/007; B32B 9/045; C09D 127/12
USPC ......... 132/163, 202, 212, 162, 221, 269, 319, 132/320, 333, 321, 273, 289, 129, 206, 200, 132/207, 210; 427/402, 407.1, 372.2, 180, 427/192, 195, 413, 419.1; 30/32; 524/495; 428/323, 411.1, 328, 421, 422, 447; 252/500–521.6; 15/210.1
See application file for complete search history.

(56) References Cited

U.S. PATENT DOCUMENTS

| | | | | | |
|---|---|---|---|---|---|
| 2,426,315 | A | * | 8/1947 | Marick | 15/159.1 |
| 3,760,495 | A | * | 9/1973 | Meyer | 29/610.1 |
| 3,832,226 | A | * | 8/1974 | Kondo et al. | 427/486 |
| 3,973,100 | A | | 8/1976 | Flanagan | |
| 3,976,600 | A | * | 8/1976 | Meyer | 252/511 |
| 3,999,040 | A | * | 12/1976 | Ellis | 219/543 |
| 4,032,752 | A | * | 6/1977 | Ohmura et al. | 219/541 |
| 4,415,626 | A | * | 11/1983 | Hasenauer et al. | 428/323 |
| 4,549,559 | A | * | 10/1985 | Gueret et al. | 132/219 |
| 4,610,925 | A | * | 9/1986 | Bond | 428/368 |
| 4,786,560 | A | * | 11/1988 | Crocker | 428/500 |
| 4,797,966 | A | * | 1/1989 | Fong | 15/186 |
| 5,066,422 | A | * | 11/1991 | Felter et al. | 252/511 |
| 5,150,491 | A | * | 9/1992 | Ikemoto | 15/1.52 |
| 5,213,887 | A | * | 5/1993 | Huffman | 428/323 |
| 5,631,311 | A | * | 5/1997 | Bergmann et al. | 523/333 |
| 5,712,040 | A | * | 1/1998 | Nakahara et al. | 428/421 |
| 5,747,150 | A | * | 5/1998 | Yamamoto et al. | 428/220 |
| 5,849,399 | A | * | 12/1998 | Law et al. | 428/212 |
| 5,885,706 | A | * | 3/1999 | Bergmann et al. | 428/323 |
| 5,954,910 | A | * | 9/1999 | Kikukawa et al. | 156/307.1 |
| 5,967,150 | A | * | 10/1999 | Wright et al. | 132/119.1 |
| 5,968,871 | A | * | 10/1999 | Katashima et al. | 503/227 |
| 6,001,749 | A | * | 12/1999 | Child et al. | 442/71 |
| 6,319,594 | B1 | * | 11/2001 | Suzuki et al. | 428/208 |
| 6,503,627 | B1 | * | 1/2003 | Niimi et al. | 428/409 |
| 6,740,410 | B2 | * | 5/2004 | Fahey et al. | 428/411.1 |
| 6,901,936 | B2 | * | 6/2005 | Kampel | 132/262 |
| 7,171,970 | B2 | * | 2/2007 | Saida et al. | 132/271 |
| 7,476,339 | B2 | * | 1/2009 | Czubarow et al. | 252/500 |
| 7,544,742 | B2 | * | 6/2009 | Walsh | 525/185 |
| 7,553,907 | B2 | * | 6/2009 | Lee | 525/199 |
| 8,029,884 | B2 | * | 10/2011 | Miyazaki et al. | 428/212 |
| 8,051,525 | B2 | * | 11/2011 | Bernat Bernat | 15/160 |

(Continued)

FOREIGN PATENT DOCUMENTS

| | | | |
|---|---|---|---|
| EP | 0416741 | A1 | 3/1991 |
| EP | 0848919 | A1 | 6/1998 |

(Continued)

OTHER PUBLICATIONS

CeraSol Ceramic Coating Applications, http://www.cerasol.com.hk/app_2.html, 2009.
ASTM International Designation: D 257-07, "Standard Test Methods for DC Resistance or Conductance of Insulating Materials", 2007, pp. 1-18.
ESD Association Advisory 1.0-2004, for Electrostatic Discharge Terminology Glossary, 2004, 19 pages.
European Search Report of the European Patent Office mailed on Jul. 14, 2011 regarding Application 11160867.5-1258, filed Apr. 1, 2011, 7 pages.
Gene Chase, Ohms Per Square What!, ESD Journal, Jun. 26, 2011, pp. 1-2, Fowler Associates for ESD Consulting and Testing.

(Continued)

*Primary Examiner* — Vanitha Elgart
(74) *Attorney, Agent, or Firm* — Armstrong Teasdale LLP

(57) ABSTRACT

This disclosure relates to personal grooming apparatus that include coatings on the surface thereof that incorporate static dissipative additives that reduce the static build-up in the hair of users as compared to conventional apparatus. Other aspects of the present disclosure relate to methods for producing such apparatus, and methods for grooming the hair of an individual.

11 Claims, 5 Drawing Sheets

(56) References Cited

U.S. PATENT DOCUMENTS

| | | | |
|---|---|---|---|
| 8,092,904 B2* | 1/2012 | Pellerite et al. | 428/323 |
| 2003/0003302 A1* | 1/2003 | Fahey et al. | 428/411.1 |
| 2003/0035947 A1* | 2/2003 | Heberger et al. | 428/336 |
| 2003/0209252 A1* | 11/2003 | Choy | 132/163 |
| 2004/0053552 A1 | 3/2004 | Child et al. | |
| 2005/0051188 A1 | 3/2005 | Leung | |
| 2007/0003754 A1 | 1/2007 | Okada et al. | |
| 2007/0292679 A1* | 12/2007 | Pellerite et al. | 428/328 |
| 2008/0070030 A1* | 3/2008 | Baran et al. | 428/323 |
| 2008/0110471 A1* | 5/2008 | Oliver et al. | 132/148 |
| 2008/0127989 A1* | 6/2008 | Chapman et al. | 132/118 |
| 2008/0286559 A1* | 11/2008 | Lee et al. | 428/323 |
| 2010/0078038 A1 | 4/2010 | Shami et al. | |
| 2011/0017226 A1* | 1/2011 | Choi | 132/120 |
| 2011/0094535 A1* | 4/2011 | Honnefeller et al. | 132/271 |

FOREIGN PATENT DOCUMENTS

| | | |
|---|---|---|
| EP | 0992202 A2 | 4/2000 |
| EP | 1922952 A2 | 5/2008 |
| GB | 1015373 | 12/1965 |
| GB | 2211419 A | 5/1989 |
| JP | 2007098064 A | 4/2007 |
| WO | 2007014035 A2 | 1/2007 |

OTHER PUBLICATIONS

Communication pursuant to Article 94(3) EPC issued in European Application No. 11160867.5 (4 pages) (Aug. 30, 2013).

Communication pursuant to Article 94(3) EPC issued in European Application No. 11160867.5 (4 pages)(Jun. 18, 2012).

Summons to attend Oral Proceedings for European Patent Application No. 11160867.5-1653 (Feb. 12, 2014)(28 pages).

* cited by examiner

STATIC DISSIPATIVE PERSONAL CARE APPARATUS FOR GROOMING HAIR

BACKGROUND

The field of this disclosure relates to personal grooming apparatus, such as hair straighteners and curling irons. The apparatus include coatings on the surface thereof that incorporate static dissipative additives that reduce the static build-up in the hair during use as compared to conventional apparatus. Other aspects of the present disclosure relate to methods for producing such apparatus, and methods for grooming the hair of an individual.

When hair is groomed, the hair gives up surface electrons to the grooming device and develops a positive electrostatic charge. The positive charge of the individual hairs causes the hairs to repel one another resulting in a "static flyaway" condition (e.g., "frizzy" hair). The ability of the hair to give up electrons is partially dependent on the amount of moisture in the hair, with increasing amounts of moisture resulting in decreased electron conductivity. Thus, the static flyaway condition of hair is exaggerated when the hair is relative dry, such as in the winter months.

Hair may be exposed to high temperatures for styling purposes. The high temperatures drive out moisture and allow the hair to be "locked" into a temporary style that persists until water is reabsorbed. However, by driving out moisture, the hair readily gives up electrons which can lead to the static flyaway condition.

A continuing need therefore exists for personal care apparatus for grooming hair that reduce the static build-up of hair during grooming and reduce the contact electrification between the hair and the grooming device. A need also exists for methods for producing such personal care apparatus (e.g., curlers, straighteners and the like) and for methods for personal grooming that involve use of apparatus that reduce static build-up of hair.

SUMMARY

In accordance with the present disclosure, materials that may be characterized as being static dissipative are incorporated into coatings that are formed on apparatus for grooming hair. The materials reduce the amount of static charge that builds up in the hair as compared to conventional personal care apparatus.

In one aspect of the present disclosure, a grooming apparatus for grooming the hair of a user contains a substrate and a coating disposed on the substrate. The coating has a surface for contacting hair during grooming and has a surface resistivity of less than about $1 \times 10^{13}$ ohms/square. The coating includes a structural component selected from a base resin, ceramic material and mixtures thereof. The coating includes a static dissipative additive dispersed throughout the structural component to reduce the surface resistivity of the coating.

Another aspect of the present disclosure is directed to a method for enhancing the static dissipative effect of a substrate of a personal grooming apparatus that is used to groom hair. In accordance with the method, a coating composition is applied to the substrate of the apparatus. The coating composition includes a structural component selected from a base resin, ceramic material and mixtures thereof. The coating composition includes a static dissipative additive dispersed throughout the structural component. The coated substrate is heated to vaporize the solvent and form a coating. The coating has a surface resistivity of less than about $1 \times 10^{13}$ ohms/square.

Yet another aspect of the present disclosure is directed to a method for grooming the hair of an individual. In accordance with the method, hair is contacted with a personal grooming apparatus. The apparatus has a substrate and a coating disposed on the substrate. The coating includes a structural component selected from a base resin, ceramic material and mixtures thereof. The coating includes a static dissipative additive dispersed throughout the structural component to reduce the surface resistivity of the coating. The coating has a surface for contacting hair during grooming and has a surface resistivity of less than about $1 \times 10^{13}$ ohms/square.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

In accordance with the present disclosure, a personal grooming apparatus includes a coating on a surface thereof that incorporates one or more static dissipative additives. For purposes of the present disclosure, "personal grooming apparatus" or "personal care apparatus" includes any item that is used to groom the hair of a user without limitation. Suitable apparatus that groom the hair include, for example, hair straighteners, hair curlers, curling irons, hot rollers (synonymously "hot curlers"), brushes, combs, picks, devices for securing hair (hair ties, berets, etc.), hair clippers and hair razors (including the friction-reducing strips or pads incorporated into hair razors). In this regard, personal grooming apparatus other than those listed above may be used without departing from the scope of the present disclosure.

The substrates to which the coating compositions of the present disclosure are applied are generally a surface which contacts the hair during use. For instance, the substrate may be the plates (e.g., aluminum or ceramic) of a hair straightener, the barrel of a curling iron, or the teeth or bristles of a comb or brush.

Generally, the static dissipative coatings of the present disclosure are capable of coating essentially any type of surface commonly used for a personal grooming apparatus, including substrates that are composed of metal (e.g., aluminum, low carbon or stainless steel alloys), ceramics (e.g., silica, alumina or silicon carbide) or thermoplastics (e.g., polymer materials). The coatings may also be applied directly to the surface or substrate of the apparatus, or to a base coating that has previously been formed or deposited on the substrate material.

Figure 1:
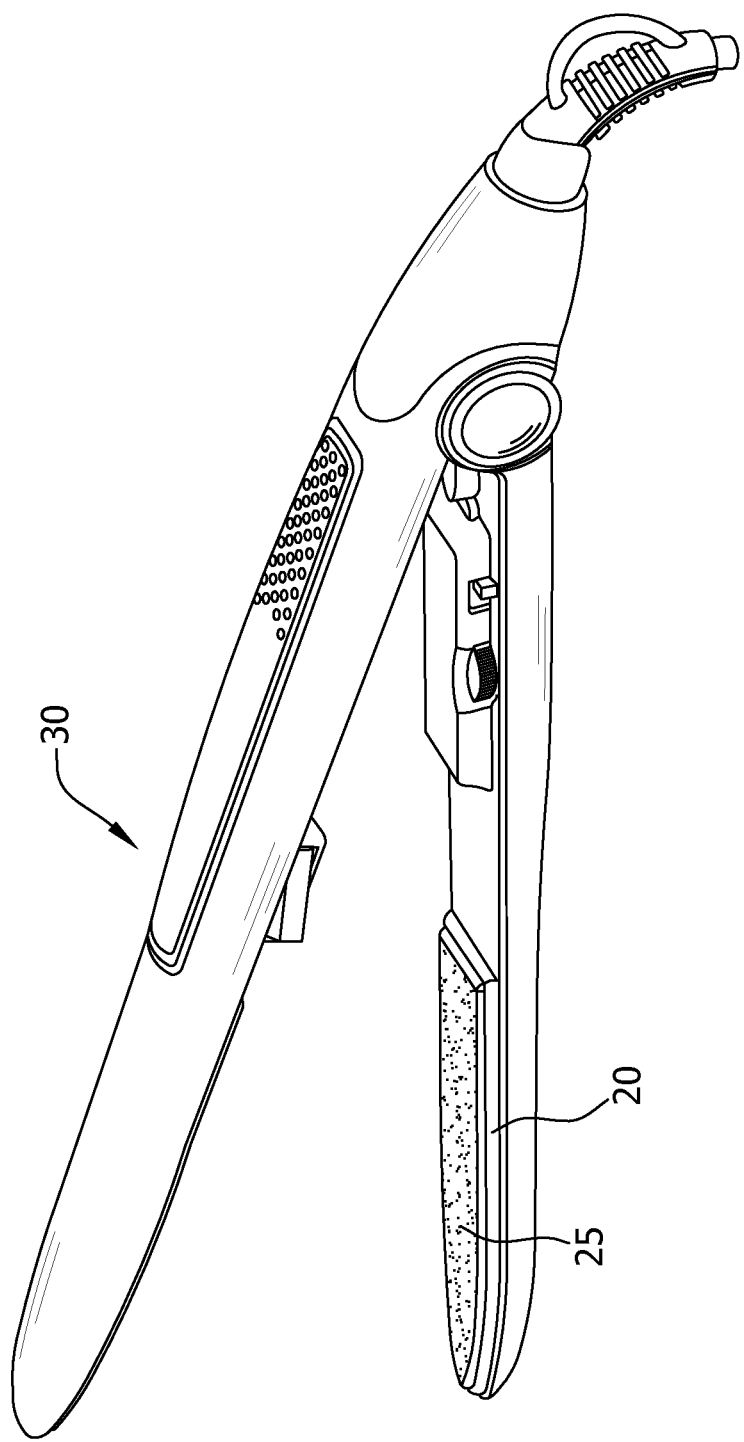
FIG. 1 is a perspective view of a hair straightener with a coating of the present disclosure disposed thereon.
Figure 2:
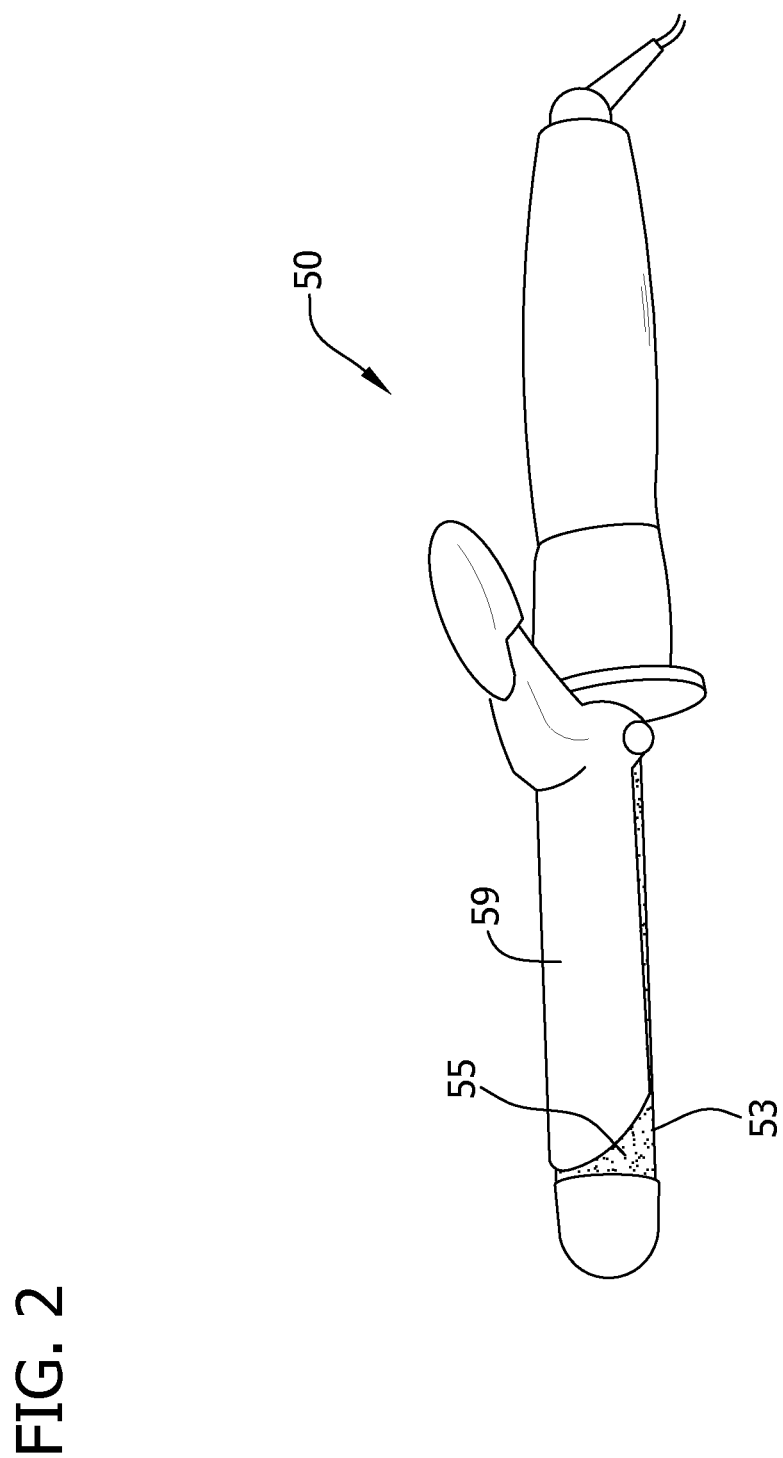
FIG. 2 is a perspective view of a hair curling iron with a coating of the present disclosure on the barrel portion thereof.

Referring now to FIG. 1, a hair straightener 30 which is an exemplary personal care apparatus is shown. The straightener 30 contains a heating plate 20 with a static dissipative coating 25 of the present disclosure disposed thereon. Another example of a personal grooming apparatus is a hair curling iron 50 which is shown in FIG. 2. The curling iron 50 includes a barrel 53. A static dissipative coating 55 of the present disclosure may be disposed on the barrel 53. A static dissipative coating (not shown) may also be applied to the underside of the hair securing clip 59.

Figure 3:
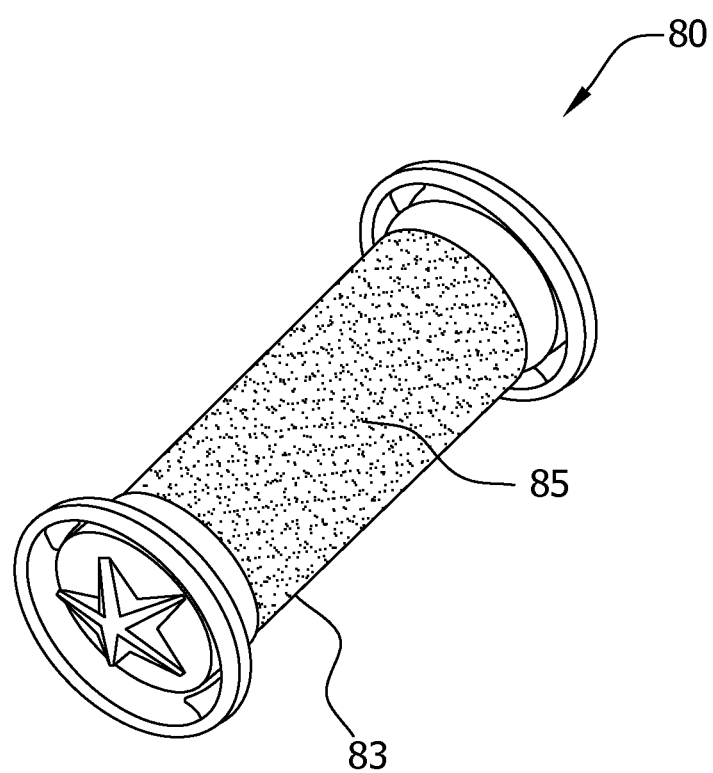
FIG. 3 is a perspective view of a hair hot roller with a coating of the present disclosure on the central tubular portion thereof.

Another example of a personal care apparatus of the present disclosure is a hot roller 80 which is illustrated in FIG. 3. The hot roller 80 includes a central tubular portion 83. The central tubular portion 83 includes a static dissipative coating 85 of the present disclosure thereon.

It should be noted that while the static dissipative coatings are described herein in relation to reducing the static build-up of hair during use of personal care apparatus, the coatings may also be use to reduce static build-up of the skin during grooming of the skin (e.g., as in exfoliating pads or razors, including the cutting surface and/or friction-reducing pads or strips thereof) without limitation.

Coating Compositions

The personal care apparatus of the present disclosure are generally prepared by applying a coating composition to a targeted surface of the apparatus. In this regard it should be understood that, as used herein, "coating compositions" or simply "compositions" refer to the composition that is applied to the substrate of the apparatus and not the coating itself which forms after additional processing steps (e.g., vaporization of solvent, heating, curing, sintering and the like). As used herein, the term "coating" refers to the material on the surface of the substrate after all processing steps are complete and is not meant to include any solvent and/or carrier that evaporates from the coating composition.

For instance, in certain embodiments of the present disclosure, the coating composition contains a volatile carrier or solvent such as an alcohol that may be evaporated from the composition to form the "coating." The percent inclusion of components of the "coating composition" as described below refer to the material applied to the substrate of the personal grooming apparatus; whereas, percent inclusion of the components of the "coating" (described below under the section entitled "Static Dissipative Coatings") refer to the solid material covering a portion of the substrate after all processing steps are complete. Unless described otherwise, listed percentages are given as the percentage of the entire composition or entire coating, including the component or components being described.

Generally, the coating compositions of the present disclosure incorporate one or more static dissipative additives to reduce the static build-up of the groomed material, as compared to conventionally used coatings that do no contain such static dissipative additives. In one or more embodiments, the static dissipative additive is selected and added in a concentration sufficient to reduce the surface resistivity of the coating to less than about $1 \times 10^{14}$ ohms/square and, in other embodiments, to less than about $1 \times 10^{13}$ ohms/square, less than about $1 \times 10^{12}$ ohms/square, less than about $5 \times 10^{11}$ ohms/square, less than about $1 \times 10^{11}$ ohms/square, less than about $5 \times 10^{10}$ ohms/square, less than about $1 \times 10^{10}$ ohms/square, less than about $5 \times 10^{9}$ ohms/square or even less than about $1 \times 10^{5}$ ohms/square. Suitable static dissipative additives include carbon particles and static dissipative metals, such as aluminum. Other metals that dissipate static include powdered brass alloys and steel alloys.

In this regard, the static dissipative additive may be included in the coating composition in a "static dissipative amount" which, for purposes of the present disclosure, is an amount that causes the coating (after all coating composition processing steps such as, for example, curing are complete) to have a surface resistivity of less than about $1 \times 10^{13}$ ohms/square. Furthermore, it should be understood that the static dissipative additive may be added in an amount which causes the static dissipative coating to have a surface resistivity within the ranges listed above (e.g., less than about $1 \times 10^{12}$ ohms/square, less than about $5 \times 10^{11}$ ohms/square, less than about $1 \times 10^{11}$ ohms/square, less than about $5 \times 10^{10}$ ohms/square, less than about $1 \times 10^{10}$ ohms/square, less than about $5 \times 10^{9}$ ohms/square or even less than about $1 \times 10^{5}$ ohms/square).

Suitable carbon particles that may be used in the coating composition include carbon black, graphite and carbon nanotubes. Graphite that is used may be natural or synthetic, as well as their derivatives (including graphene, graphite nano platelets or expanded graphite). Non-graphitic forms of carbon, such as coke, charcoal or activated carbon, may also be used as static dissipative additives.

In various embodiments of the present disclosure, the coating composition contains at least about 0.1 wt % carbon particles. In other embodiments, the coating composition contains at least about 0.5 wt %, at least about 1 wt %, at least about 4 wt % or at least about 10 wt % (e.g., from about 0.1 wt % to about 14 wt %, from about 1 wt % to about 14 wt % or from about 2 wt % to about 8 wt %).

Alternatively or in addition to carbon, aluminum may be added to the coating composition as a static dissipative additive. Aluminum may be added to the coating composition as a powder or in the form of a paste. The paste may contain functional components (such as, for example, corn starch or petroleum jelly) that affect the flowability of the paste, and/or components that act as a preservative (such as zinc oxide). The amount of aluminum metal (i.e., aluminum metal itself rather than the total amount of paste when pastes are used) in the coating composition may be at least about 1 wt % and, in other embodiments, is at least about 4 wt %, at least about 10 wt %, at least about 20 wt % (e.g., from about 1 wt % to about 35 wt %, from about 4 wt % to about 25 wt % or from about 8 wt % to about 18 wt %). In this regard, amounts of carbon and/or aluminum other than as listed above may be used in the coating composition and the listed amounts should not be considered in a limiting sense. Steel alloy metal may be included in the coating composition with or without aluminum and/or carbon particles. The amount of steel alloy that may be included in the composition corresponds to the amounts of aluminum recited above (e.g., at least about 1 wt %, at least about 4 wt %, at least about 10 wt %, at least about 20 wt %, from about 1 wt % to about 35 wt %, from about 4 wt % to about 25 wt % or from about 8 wt % to about 18 wt %).

It should be understood that, in some embodiments, both aluminum and carbon are included in the coating composition. When both aluminum and carbon are used, the amount of each additive may be within the ranges described above. In embodiments wherein both aluminum and carbon are used as static dissipative additives, the weight ratio of aluminum to carbon may be from about 1:5 to about 20:1 and, in other embodiments, from about 1:1 to about 10:1 (e.g., from about 2:1 to about 5:1).

Generally, the particle size of the static dissipative additive is not critical; however, the size of the static dissipative additive (as well as any other material in the coating composition) should be less than the largest particle size that passes through any coating composition filtering operation (e.g., particles less than about 30 µm or less than about 75 µm in size).

The coating compositions of the present disclosure may also contain a structural component (e.g., polymer resin and/or ceramic material) through which the static dissipative additive is dispersed. In this regard, it should be noted that the static dissipative additive need not be uniformly dispersed throughout the structural component and there may be localized concentrations that are higher or lower than the average concentration in the coating composition and use of the term "dispersed" should not be considered in a limiting sense.

Is some embodiments, the static dissipative additive is dispersed throughout a fluoropolymer such as, for example, polytetrafluoroethylene, perfluoroalkoxy, fluorinated ethylene propylene and mixtures thereof; however, it should be understood that other polymers including polymers other than fluoropolymers may be used without limitation. The fluoropolymers act to reduce the friction of the coating of the personal care apparatus such that the personal grooming apparatus is suitable for use in hair grooming. The fluoropolymers may be silicone modified (i.e., a co-polymer with silicone functionality may be incorporated into the fluoropolymer) which allows the coating to be more durable and to better withstand temperature extremes. The amount of fluoropolymer resin that is used in the coating composition may be at least about 20 wt %, at least about 40 wt % or at least about 50 wt % (e.g., from about 20 wt % to about 85 wt %, from about 40 wt % to about 85 wt % or from about 50 wt % to about 70 wt %).

The coating composition may also optionally contain one or more ceramics (e.g., silica, alumina, titania or silicon carbide). When combined with fluoropolymers, the ceramic materials allow the coating to be sufficiently hard after processing (e.g., curing). When the coating composition contains ceramics, the ceramics are generally combined with the fluoropolymer resin; however, in certain embodiments, the ceramics are used without any amount of fluoropolymer resin and the ceramics themselves give the coating its basic structure. When combined with a fluoropolymer, the amount of ceramics in the composition may be at least about 1 wt % and, in other embodiments, at least about 3 wt % or at least about 5 wt % (e.g., from about 1 wt % to about 15 wt % or from about 1 wt % to about 10 wt %). When the coating composition does not contain fluoropolymer resins, the amount of ceramic material in the coating composition may be at least about 30 wt %, at least about 50 wt % or even at least about 70 wt % (e.g., from about 30 wt % to about 90 wt %, from about 40 wt % to about 80 wt % or from about 50 wt % to about 80 wt %). In some embodiments, the coating composition does not contain ceramic material.

The coating compositions of the present disclosure may also contain an amount of tourmaline (e.g., from about 0.01 wt % to about 10 wt %). It is believed that tourmaline produces negative ions when heated which reduces hair static. Other functional components may be included in the coating composition without departing from the scope of the present disclosure. For instance, the coating composition may optionally include one or more additives such as colorants, binders, dispersants, sintering aids, plasticizers, antimicrobials (e.g., nano silver or nano titanium dioxide), hardeners (e.g., nano-diamond) and the like.

The coating composition may include one or more coloring agents (i.e., "colorants") that modify the appearance of the coating. Examples of such colorants include mica powder and various color pigments. The amount of colorants in the coating composition may range from about 0.01 wt % to about 20 wt % (e.g., from about 0.5 wt % to about 15 wt % or from about 3 wt % to about 15 wt %).

Generally, the binder alters the rheology of the coating composition and maintains the distribution of particles in the solution throughout application and curing. Suitable binders for use in the coating composition include polyvinyl butyral which may be present in an amount of at least about 0.5 wt % (e.g., 0.5 wt % to about 20 wt % or from about 1 wt % to about 10 wt %).

The coating composition may optionally include a dispersant that acts to prevent any particulate (e.g., ceramics) from settling prior to application of the coating composition to the substrate. The dispersant may be present in an amount of at least about 0.05 wt % (e.g., from about 0.05 wt % to about 10 wt %, from about 0.1 wt % to about 7.5 wt % or from 0.5 wt % to about 5 wt %). One suitable dispersant for use in the composition is a methyloxirane polymer.

A plasticizer may also be included in the composition. The plasticizer may be chosen to allow the coating composition to dry without cracking. The plasticizer may be present in an amount of at least about 0.5 wt % (e.g., 0.5 wt % to about 20 wt % or from about 1 wt % to about 10 wt %). One suitable plasticizer is polyethylene glycol.

The coating composition generally includes a "medium" or "carrier" in which the coating components are applied to the substrate. For instance, the medium may be a solvent in which one or more coating composition components at least partially dissolves. In this regard, it should be understood that while the term "solvent" is used herein, some of the composition components (e.g., ceramics) remain substantially in particulate form throughout the solvent. Thus, the solvent may also be referred to as a "diluent" in which the particulate components are suspended. For purposes of the present disclosure, the terms "medium," "carrier," "diluent," and "solvent" may be used interchangeably and are not meant to limit embodiments of the present disclosure to compositions wherein one or more components do or do not dissolve.

Suitable solvents include organic compounds such as, for example, C1 to C10 alcohols, methyl ethyl ketone, acetone, petroleum distillates and combinations of these compounds. The amount of solvent may vary according to the desired flowability of the coating composition. In some embodiments of the present disclosure, the coating composition contains at least about 5 wt % solvent (or solvents when more than one solvent is used) and, in other embodiments, at least about 10 wt % or even about 20 wt % solvent (e.g., from about 5 wt % to about 40 wt % or from about 5 wt % to about 30 wt % solvent). Preferably the solvent vaporizes readily during any drying steps. The composition may include more than one solvent with the total weight fraction of solvents in the composition being as described above.

Water is generally not used as a solvent when fluoropolymer resins are included in the composition as water in some instances may be immiscible with fluoropolymers. However, when fluoropolymers are not used (e.g., ceramics are used as the primary coating material), water may be used as a solvent and, optionally, may be combined with one or more organic solvents.

In one or more embodiments of the present disclosure, the coating composition containing static dissipative material is applied to a base coating that is disposed on the substrate. Similar to the static dissipative top coating, the base coating may contain fluoropolymers and ceramics (e.g., silica, titania, zirconia, and chromic (III) oxide). The base coating may also contain other additives such as barium sulfate that improve the rheological properties of the coating and, optionally, binders, dispersants, sintering aids, plasticizers and the like. These components may be included in the base composition in the same amounts as described above for the static dissipative coating. The base coating optionally does not contain static dissipative additives as the static dissipative coating is disposed on its surface; however, the base coating may contain such additives without departing from the scope of the present disclosure. In this regard, it should be noted that other arrangements of coating layers may be used including arrangements in which more than two layers are used or in which the static dissipative coating is not disposed on the surface of the substrate without departing from the scope of the present disclosure.

Methods for Applying the Coating Compositions of the Present Disclosure

The substrate materials to which the static dissipative coating compositions of the present disclosure are applied may be subjected to one or more surface preparation procedures before the coating composition is applied. For instance, the surface may be cleaned by rinsing in water or in a dilute cleaning solution that is compatible with the substrate (e.g., a solution of trichloroethylene or other degreasing solution). The surface of the substrate may also be smoothed by conventional surface roughness reduction techniques (e.g., sand or alumina blasting) to remove any surface roughness that may extend through the coating. Sand or alumina-blasting may also be performed to assist in adhesion of the coating composition to the substrate. The coating composition may be subjected to a filtering operation (e.g., screening) before application of the coating composition so as to remove undesirable larger particles (e.g., particles greater than about 30 μm or greater than about 75 μm in size).

The coating composition may generally be applied to the substrate by any of the methods known to those of ordinary skill in the art. Suitable methods include spray coating, immersion, brushing and powder coating techniques. Conventional spray coating methods may be used including air, air-assisted, airless and electrostatic atomization. Air Atomization may be performed under high-volume, low pressure conditions, such as pressures below about 35 MPa. It should be noted that when powder coating techniques are used, the coating composition does not contain solvents and no curing step is performed. Generally, the coating composition is a powder that has the same chemical composition of the coating itself. Powder coating techniques known to those of skill in the art may be used in accordance with the present disclosure.

In methods other than powder coating techniques, the coating composition is generally cured to evaporate liquid solvents and diluents and to form and harden the coating. In some embodiments, the coating composition is heated to a temperature of at least about 140° C. and, in other embodiments, to a temperature of at least about 200° C., at least about 300° C., at least about 400° C. (e.g., from about 140° C. to about 500° C. or from about 180° C. to about 300° C.). Other temperatures may be used without departing from the scope of the present disclosure such as room temperature air drying and temperatures at which the coating is sintered (e.g., above about 1000° C.). Curing typically may be completed in from about ten minutes to about two hours, depending on the amount of solvent and the temperatures used to cure.

As described above, the static dissipative coating may be applied to the surface of a base coating that is disposed on the surface of the substrate. The base coating may be formed by the methods described above relating to application of the static dissipative coating. In some embodiments, the base coating is formed by spraying a base coating composition to the substrate and curing the composition (e.g., to at least about 140° C.). The base coating may be cured before application; however, in some embodiments of the present disclosure, the top coating is applied to the base coating before any curing operations and the base coating and top coating compositions are cured at once (i.e., wet-on-wet coating).

In embodiments wherein a single coating is applied to the substrate of the personal grooming apparatus (i.e., when a base coating is not used), the coating composition may be applied such that the coating as cured has a thickness of at least about 1 μm, at least about 5 μm, at least about 25 μm, at least about 50 μm or at least about 150 μm (e.g., from about 5 μm to about 500 μm, from about 8 μm to about 60 μm or from about 15 μm to about 30 μm).

When multiple coatings are applied (e.g., a base coat applied to the surface of the substrate with a static dissipative coating applied thereto), the total thickness of the coatings applied to the substrate are generally within the ranges described above. In various embodiments, the static dissipative coating (which is typically the surface coating) may have a thickness of less than about 100 μm, less than about 50 μm, or less than about 20 μm (e.g., from about 3 μm to about 100 μm, from about 3 μm to about 20 μm or from about 10 μm to about 20 μm). In some embodiments, the base coating is thicker than the static dissipative coating (e.g., from about 5 μm to about 50 μm thicker). The thickness of the base coating may be less than about 150 μm, less than about 75 μm, less than about 40 μm or less than about 30 μm (e.g., from about 10 μm to about 150 μm, from about 3 μm to about 30 μm or from about 15 μm to about 30 μm). In this regard, other thicknesses may be used without departing from the scope of the present disclosure and the recited ranges should not be viewed in a limiting sense.

Static Dissipative Coatings

The coatings of the personal care apparatus of the present disclosure generally include the components of the coating composition described above excluding any amount of material that was removed during processing (e.g., evaporated solvent). In certain embodiments, the coating contains static dissipative additives (e.g., aluminum or carbon particles), one or more fluoropolymers and one or more ceramic materials. The static dissipative additive may be included in the coating in a "static dissipative amount" as described above or in amount that causes the static dissipative coating to have a surface resistance in the ranges described below.

Generally, when the coating composition contains static dissipative carbon particles, the coating as applied (i.e., after all processing steps including curing have been completed) contains at least about 0.1 wt % carbon particles and, in other embodiments, the coating composition contains at least about 0.5 wt % carbon particles, at least about 1 wt %, at least about 4 wt % or at least about 10 wt % carbon particles (e.g., from about 0.1 wt % to about 20 wt %, from about 1 wt % to about 15 wt % or from about 2 wt % to about 10 wt %).

When aluminum is added to the coating composition as a static dissipative additive (with or without carbon particles), the amount of aluminum metal in the coating after processing (e.g., curing) may be at least about 1 wt % and, in other embodiments, is at least about 4 wt %, at least about 10 wt %, at least about 20 wt % (e.g., from about 1 wt % to about 45 wt %, from about 4 wt % to about 35 wt % or from about 10 wt % to about 25 wt %). When both aluminum and carbon are used, the amount of each additive may be within the ranges described above. In this regard, it should be noted that the percent inclusions recited above for carbon particles and aluminum are expressed as a percentage weight of the static dissipative coating and material from any other base coatings and/or top coatings are excluded in the calculation of the percent inclusion.

The coating may also include fluoropolymers and ceramics after processing. The amount of fluoropolymers may be at least about 20 wt %, at least about 40 wt % or at least about 50 wt % (e.g., from about 20 wt % to about 90 wt %, from about 40 wt % to about 90 wt % or from about 50 wt % to about 85 wt %). When combined with the fluoropolymer, the amount of ceramic material (e.g., silica, titania, alumina and the like) may be at least about 1 wt % and, in other embodiments, at least about 3 wt % or at least about 5 wt % (e.g., from about 1 wt % to about 20 wt % or from about 1 wt % to about 15 wt %). When the coating composition does not contain fluoropolymer resins, the amount of ceramic material in the coating composition may be at least about 30 wt %, at least about 50 wt % or even at least about 70 wt % (e.g., from about 30 wt % to about 90 wt %, from about 40 wt % to about 80 wt % or from about 50 wt % to about 80 wt %). In some embodiments, the coating does not contain an amount of ceramics. The coating may also contain residual colorants, binders, dispersants, plasticizers, and sintering agents that were not removed during processing (e.g., curing).

The coatings disposed on the personal care apparatus are generally "static dissipative" in that the coatings reduce the amount of static charge that builds up in the material which is groomed (e.g., hair) as compared to conventional personal care apparatus. For instance, the carbon particles and/or aluminum may increase the surface conductivity of the coating (or, stated differently, reduce the surface resistivity of the coating) compared to coatings which do not include such materials. Without being bound to any particular theory, it is believed that the coatings described herein generally allow electrons that are transferred from the groomed material to the personal care apparatus during use to be more readily transferred back to the groomed material and, conversely, allows electrons that are transferred from the personal care apparatus to the groomed material during use to be more readily transferred back to the personal care apparatus. Such coatings are said to be "static dissipative" in that they reduce the static build-up of the groomed material as compared to conventionally used coatings.

In addition to being static dissipative, the coatings described herein may be "antistatic" in that the coatings resist triboelectric charging when used relative to conventional coating materials. As appreciated by those of skill in the art, materials that resist triboelectric charging generally are positioned in the triboelectric series relatively close to the material with which they are contacted. Thus, in embodiments of the present disclosure, the static dissipative coating is closer to the groomed material (e.g., hair) in the triboelectric series as compared to conventional coatings. For instance, hair has an affinity for positive charging (e.g., loss of electrons) of about 45 nC/J (i.e., nanocoulombs of transferred charge per joule of friction energy applied between the surfaces). Conventional fluoropolymer-based coatings may have an affinity for positive electrons of less than about −100 nC/J or even less than about −150 nC/J (e.g., about 175 nC/J). Incorporation of static dissipative additives into the fluoropolymer resins increases the affinity for positive charging of the coating (such as, for example, to at least about −100 nC/J or even to at least about −50 nC/J), thereby decreasing the difference in positive charging affinity between hair and the coating.

In some particular embodiments, the coating has a surface resistivity of less than about $1\times10^{14}$ ohms/square, less than about $1\times10^{13}$ ohms/square, less than about $1\times10^{12}$ ohms/square, less than about $5\times10^{11}$ ohms/square, less than about $1\times10^{11}$ ohms/square, less than about $5\times10^{10}$ ohms/square, less than about $1\times10^{10}$ ohms/square, less than about $5\times10^{9}$ ohms/square or even less than about $1\times10^{5}$. Accordingly, in various exemplary embodiments, the surface resistivity may range from about $1\times10^{3}$ ohms/square to about $1\times10^{14}$ ohms/square, from about $1\times10^{3}$ ohms/square to about $1\times10^{12}$ ohms/square, or from about $1\times10^{3}$ ohms/square to about $1\times10^{10}$ ohms/square.

In some embodiments, the coatings of the personal care apparatus of the present disclosure may meet one or more industry standards for static dissipative materials. For instance, the coating materials may have a surface resistivity of less than about $1\times10^{12}$ ohms/square and at least about $1\times10^{5}$ ohms/square as set forth in the definition of "static dissipative" materials as established by the Electrostatic Discharge Association (Rome, N.Y.) in ESD ADV1.0-2004, which is incorporated herein for all relevant and consistent purposes.

Surface resistivity (and surface conductivity) may be measured according to any of the methods available to those of skill in the art. For instance, surface resistivity of the coating compositions of the present disclosure may be measured by first measuring the surface resistance of the coating and then calculating surface resistivity by use of the geometric dimensions of the tested sample and of the electrodes. In this regard, the measurement methodology and calculations set forth by ASTM International (West Conshohocken, Pa.) in ASTM D257-07 may be used. Optionally, the measurement standards set forth by the Electrostatic Discharge Association in ANSI/ESD STM11.11-2006 may be used. It is believed that the measurement protocols of ASTM D257-07 and ANSI/ESD STM11.11-2006 result in surface resistivity parameters that are relatively similar (e.g., less than about 5% difference). For purposes of the present disclosure, all surface resistivities and/or conductivities recited herein are measured by ASTM D257-07 unless indicated otherwise.

In this regard and as appreciated by those of skill in the art, "surface resistivity" or "surface conductivity" as used herein should be distinguished from "surface resistance" or "surface conductance" which do not take into account the geometric arrangement of the sample and electrodes. While both surface resistivity and surface resistance (and surface conductivity and surface conductance) may both be expressed in ohms, surface resistivity is listed as "ohms/square" to differentiate surface resistance which is typically expressed in the art only as "ohms." Further, as used herein, the recited resistivities and/or conductivities are surface measurements (e.g., surface resistivity or surface conductivity) and are not volume measurements.

EXAMPLES

Example 1

Comparison of Static Build-up During Use of a Hair Straightener with Plates Having a Static Dissipative Modified Coating and a Standard Coating Disposed Thereon Static build-up was tested on blended Caucasian hair tresses supplied from International Hair Importers (Glendale, N.Y.). The tresses were 1 inch (2.54 cm) wide and eight inches (20.32 cm) long and weighed 3 grams. Prior to testing, the tresses were equilibrated over-night at 30% relative humidity.

A hair straightener with a static dissipative coating disposed on the plates thereof and a straightener with a conventional coating (i.e., that does not contain a static dissipative agent such as aluminum or carbon) disposed on the plates were tested. The composition of the static dissipative coating is shown in Table 1 below and the composition of the standard coating is shown in Table 2 below.

TABLE 1

Components of the coating composition containing static dissipative aluminum and their percent inclusion in the composition

| Component | Inclusion (wt %) |
|---|---|
| Polymer Resin (Silicon Modified) | 62 wt % |
| Aluminum Paste | 10 wt % |
| Ethanol | 20 wt % |
| Ceramics | 8 wt % |

TABLE 2

Components of the standard coating composition and their percent inclusion in the composition

| Component | Inclusion (wt %) |
|---|---|
| Polymer Resin (Silicon Modified) | 65.6 wt % |
| Mica Powder | 4 wt % |
| Red Pigment | 0.8 wt % |
| White Pigment | 7 wt % |
| Isopropyl Alcohol | 17 wt % |
| Ceramics | 5.5 wt % |
| Tourmaline Powder | 0.1 wt % |

Both coatings were prepared by spray coating the coating composition and curing. The straighteners were a Remington model S-4880 available from Spectrum Brands (Madison, Wis.). The static dissipative coating had a surface resistivity of $1\times10^9$ ohms/square and the conventional coating had a surface resistivity of $1\times10^{14}$ ohms/square.

Each straightener was heated to its maximum temperature. After heating, the plates of each straightener were passed 10 times over ten tresses at 30% humidity with the speed and pressure of each pass being controlled. Immediately after straightening, each tress was mounted on a holder and the amount of static was read using the detector. The results are shown in FIG. 4.

After testing, the tresses were stored overnight to allow the static electricity to dissipate before retesting. Testing was repeated with the same procedures as above. The results are shown in FIG. 5.

Figure 4:
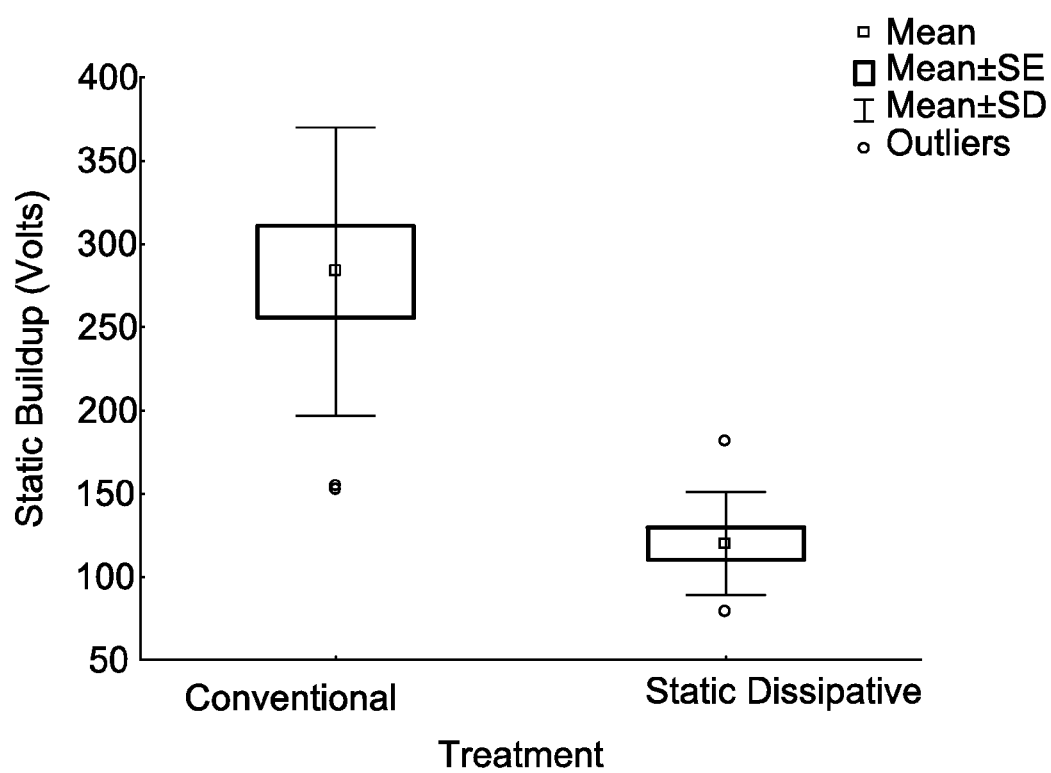
FIGS. 4 and 5 are graphs showing the amount of static build-up of hair tresses after use of a straightener with a conventional coating and with a static dissipative coating according to Example 1.
Figure 5:
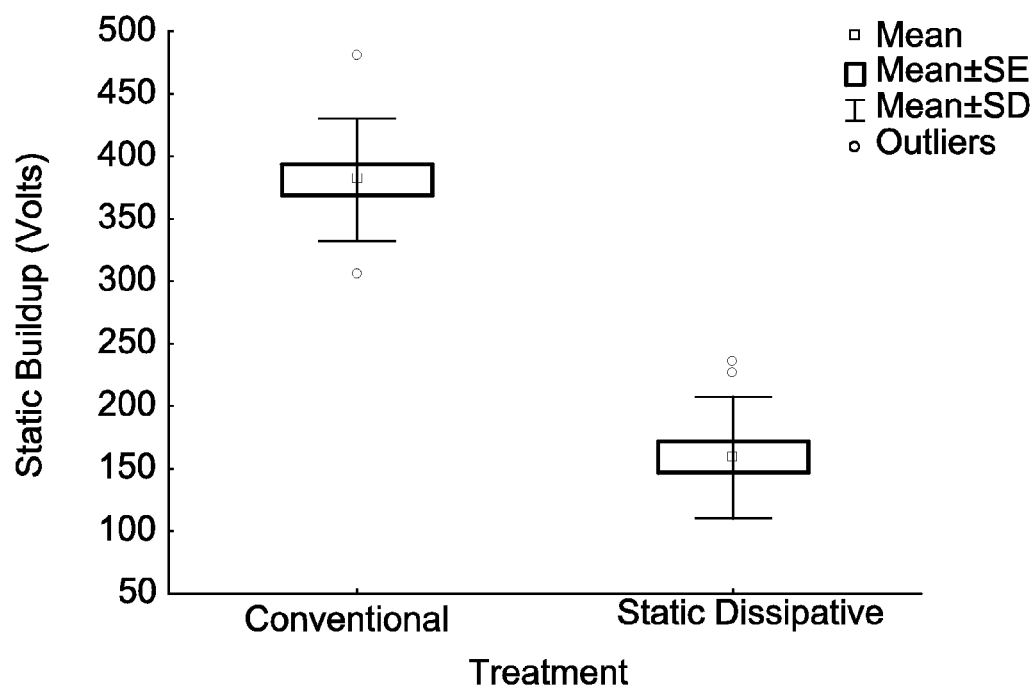

As can be seen from FIGS. 4 and 5, the straighteners that contained the static-dissipative coating caused about 60% less static build-up in the hair compared to the straightener with the conventional coating.

Example 2

Surface Resistivity Testing of Coatings Containing Carbon Particles

A coating was prepared from a composition having the components shown in Table 3 below.

TABLE 3

Components of the coating composition containing static dissipative carbon and their percent inclusion in the composition

| Component | Inclusion (wt %) |
|---|---|
| Polymer Resin (Silicon Modified) | 62.9 wt % |
| Mica Powder | 8 wt % |
| Ethanol | 18 wt % |
| Yellow Pigment | 1 wt % |
| Carbon Black | 2 wt % |
| Ceramics | 5.5 wt % |
| Zonyl Powder (TEFLON ®) | 2.5 wt % |
| Tourmaline Powder | 0.1 wt % |

The coating was divided into 20 samples and the surface resistivity of each sample was tested according to ASTM D257-07. The surface resistivity of each test is shown in Table 4 below.

TABLE 4

Surface resistivity measurements of samples of the coating containing static dissipative carbon

| Sample | Surface Resistivity |
|---|---|
| 1 | $1 \times 10^{10}$ |
| 2 | $1 \times 10^{10}$ |
| 3 | $1 \times 10^{11}$ |
| 4 | $1 \times 10^{10}$ |
| 5 | $1 \times 10^{9}$ |
| 6 | $1 \times 10^{10}$ |
| 7 | $1 \times 10^{10}$ |
| 8 | $1 \times 10^{10}$ |
| 9 | $1 \times 10^{10}$ |
| 10 | $1 \times 10^{10}$ |
| 11 | $1 \times 10^{10}$ |
| 12 | $1 \times 10^{9}$ |
| 13 | $1 \times 10^{10}$ |
| 14 | $1 \times 10^{10}$ |
| 15 | $1 \times 10^{9}$ |
| 16 | $1 \times 10^{11}$ |
| 17 | $1 \times 10^{10}$ |
| 18 | $1 \times 10^{10}$ |
| 19 | $1 \times 10^{10}$ |
| 20 | $1 \times 10^{10}$ |

The average surface resistivity of the coating was about $1.77\times10^{10}$ ohms/square. Incorporation of higher amounts of carbon black would result in lower surface resistivity measurements.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the disclosure, it is intended that all matter contained in the above description and shown in the accompanying figures shall be interpreted as illustrative and not in a limiting sense.

What is claimed is:

1. A personal grooming apparatus for grooming the hair of a user, the apparatus containing a substrate and a coating disposed on the substrate, the coating having a surface for contacting hair during grooming, the coating having a surface resistivity of less than about $1\times10^{13}$ ohms/square and comprising a structural component selected from a silicone-modified fluoropolymer base resin or ceramic material or mixtures thereof, the coating comprising a static dissipative additive dispersed throughout the structural component to reduce the surface resistivity of the coating, wherein the static dissipative additive is selected from the group consisting of aluminum, carbon particles and mixtures thereof.

2. The personal grooming apparatus as set forth in claim 1 wherein the coating comprises at least about 4 wt % aluminum.

3. The personal grooming apparatus as set forth in claim 1 wherein the coating comprises at least about 1 wt % carbon particles.

4. The personal grooming apparatus as set forth in claim 1 wherein the static dissipative additive is carbon particles and the carbon particles are selected from the group consisting of carbon black, carbon nanotubes and graphite.

5. The personal grooming apparatus as set forth in claim 1 wherein the coating comprises ceramic material and the ceramic material is selected from the group consisting of silica, alumina, zirconia, silicon carbide and mixtures thereof.

6. The personal grooming apparatus as set forth in claim 1 wherein the substrate comprises a polymer or a metal.

7. The personal grooming apparatus as set forth in claim 1 wherein the apparatus is selected from the group consisting of a hair straightener, hair curler, curling iron, hot roller, a device for securing hair, shaver, clipper, razor, friction-reducing strips or pads, brush and comb.

8. The personal grooming apparatus as set forth in claim 1 wherein the coating has a surface resistivity of less than about $1 \times 10^{10}$ ohms/square.

9. The personal grooming apparatus as set forth in claim 1 wherein the coating has a surface resistivity of at least about $1 \times 10^{3}$ ohms/square.

10. The personal grooming apparatus as set forth in claim 1 wherein the coating has a thickness of at least about 8 µm.

11. The personal grooming apparatus as set forth in claim 1 wherein the coating has an affinity for positive charging of at least about −100 nC/J.

* * * * *